June 23, 1953     W. E. RENICK     2,642,887
UNLOADING VALVE
Filed Aug. 21, 1947

INVENTOR.
WENDELL E. RENICK
BY
Herschel C. Omohundro
Attorney

Patented June 23, 1953

2,642,887

UNITED STATES PATENT OFFICE 2,642,887

UNLOADING VALVE

Wendell E. Renick, Grove City, Ohio, assignor to The Denison Engineering Company, Columbus, Ohio, a corporation of Ohio Application August 21, 1947, Serial No. 769,804

11 Claims. (Cl. 137—108)

This invention relates generally to hydraulic apparatus and is more specifically directed to unloading valves of the type used in a hydraulic system, including an accumulator, a source of fluid supply such as a constantly driven pump, and fluid-operated means which are operated at irregular times or greatly spaced intervals of time. An example of such mechanism is the landing gear of an airplane. In such apparatus the pump is directly driven by the engine and the landing gear or other mechanism may be operated only when the airplane is taking off or landing.

An object of the present invention is to provide an unloading valve in which a majority of the parts used in my relief valve shown in my copending application Serial No. 737,983, filed March 28, 1947, now Patent No. 2,580,128, granted December 25, 1951, may be employed with little or no change.

Another object of the invention is to provide an unloading valve which will have a narrow margin of variation between loading and unloading pressures.

Still another object of the invention is to provide an unloading valve having a fluid pressure responsive valve element which will open under the pressure being generated by the pump when a predetermined maximum pressure is reached and means responsive to the pressure in an accumulator for retaining such valve open as long as the accumulator pressure remains unchanged.

A further object of the invention is to provide an unloading valve having a piston-operated valve element normally urged toward a closed position, a yieldably loaded valve for establishing pressure differentials tending to open the piston valve when pressures generated by the pump reach a predetermined maximum, and a piston responsive to the accumulator pressure for maintaining the pressure differential as long as the accumulator pressures remain unchanged, the latter piston being exposed to equal pressures at opposite ends prior to the time the yieldably loaded valve moves to an open position, and to pressure differentials after such time, the accumulator pressure responsive piston having an area exposed to pressure tending to open the yieldably loaded valve, which area is greater than the area on such valve exposed to pressure tending to open the same.

Other objects and advantages of the present invention will be apparent from the following description, reference being had to the accompanying drawings wherein a preferred form of embodiment of the invention is clearly shown.

Figure 1:
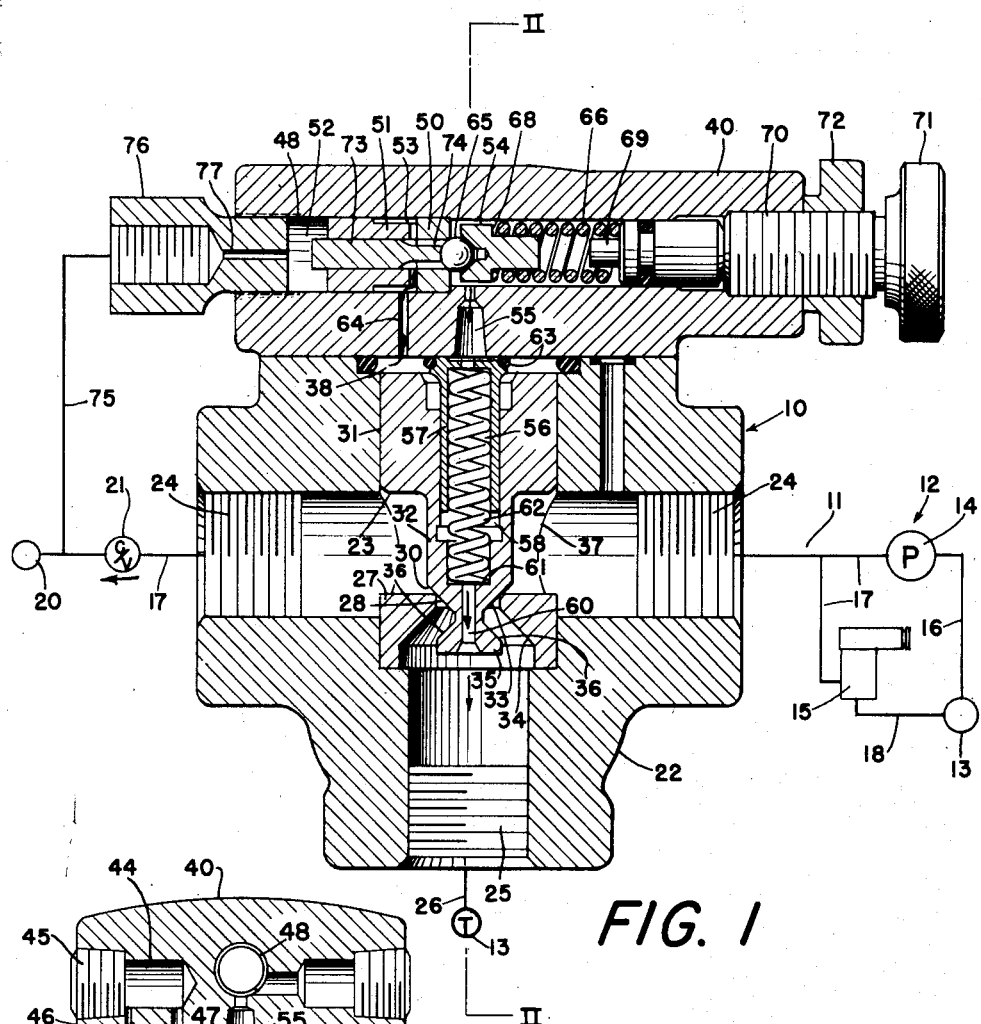
Figure 1 is a vertical sectional view taken through an unloading valve formed in accordance with the present invention, the circuit in which such valve is employed being illustrated diagrammatically.
Figure 2:
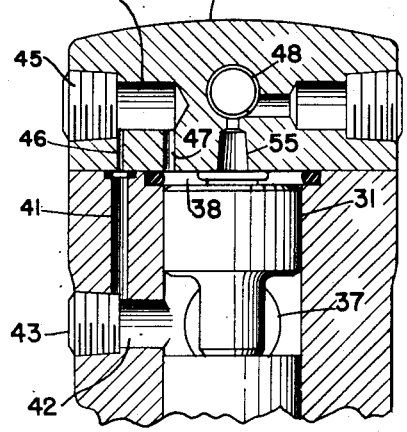
Figure 2 is a vertical transverse sectional view taken through the valve shown in Figure 1 on the plane indicated by the line II—II of Figure 1.

Referring more particularly to the drawing, the numeral 10 designates the completed unloading valve. This unloading valve is disposed in a hydraulic system 11 having a source of fluid pressure 12 which includes a reservoir 13, a power driven pump 14, a relief valve 15, and lines 16, 17 and 18 leading from the tank to the pump, from the pump to the relief valve and from the latter back to the tank, respectively. The line 17 leading from the pump is also connected with the inlet of the unloading valve 10, this line also extending to an accumulator diagrammatically illustrated at 20. Between the accumulator and the unloading valve 10, the line 17 is provided with a check valve 21 which permits fluid flow toward the accumulator but prevents flow in the opposite direction.

Valve 10 includes a body 22 having an internal cylindrical chamber 23, inlet ports 24 which are connected with the line 17 and an outlet or exhaust port 25 connected by a line 26 with the reservoir 13. At the inner end of the chamber 23 the body 22 is provided with a valve seat insert 27 in which an opening 28 is provided, this opening being surrounded by the valve seat 30. Chamber 23 slidably receives a piston body 31, the lower end of which is provided with an extension 32 having a bevelled shoulder 33 which constitutes the valve portion of the piston body. This inclined shoulder cooperates with the seat 30 to control fluid flow from the chamber 23 to the outlet port 25.

As in the relief valve illustrated in the above-mentioned Patent No. 2,580,128, the insert 27 has an outwardly and downwardly flaring wall 34 leading from the opening 28 to the outlet port 25. The extension 32 of the piston body is provided beyond the inclined shoulder 30 with a reduced head 35 having a downwardly and outwardly inclined wall 36 arranged substantially in parallel relation with the wall 34. The purpose of these walls is the same as set forth in the copending application; that is, to provide an annular passage of uniformly increasing diameter which serves to reduce the pressure of fluid flowing from the chamber 23 to the outlet port and to avoid turbulence in such fluid. This construction is also designed to eliminate chatter of the valve during the unloading operation. Piston 31 divides the chamber 23 into inner and outer sections 37 and 38, the former being in open communication with the line 17. The outer end of the chamber has restricted communication with the inner end by way of passages formed, in this instance, in the body and a cap 40 secured to the upper end of the body 22. One of the passages 41 extends into the body from the upper wall and intersects a lateral passage 42 extending into the body from the side thereof; the outer end of this passage 42 is closed by a plug 43. The cap member also has a lateral passage 44 which is closed at its outer end by a plug 45 and two vertical passages 46 and 47 extending into the cap from the under side. Passage 46 is of reduced size and registers with the upper end of passage 41. Passage 47 registers with chamber 23 and both of these passages connect with the lateral passage 44 in the cap. By this series of passages, limited communication is established between the inner and outer ends of the chamber 23, and provision is thus made to establish equal pressures at opposite ends of the piston 31. Due to the reduced size of passages 46, however, fluid flow from the inner to the outer end of the chamber will only take place at a reduced rate.

The reason for this delay will be apparent from the following description: Cap 40 is also provided with a longitudinally extending bore 48 which is provided at a point intermediate its length with a second valve seat insert 50. This insert and a piston guide sleeve 51 divide the bore into three different pressure zones 52, 53, and 54, the latter of which is connected by passage means with the outlet port 25. This passage means includes an opening 55 in the cap which registers substantially with the axial center of the chamber 23. This passage means also includes the open center bore 56 in a balancing piston 57 which is slidably received by socket 58 formed in the piston body 31. This socket is reduced at its lower end and terminates in a passage 60 extending to the lower end of the body 31 through the head 35. The reduction of the socket provides a shoulder 61 for engagement by the lower end of the coil spring 62, the upper end of this spring engaging another shoulder formed internally at the upper end of the balancing piston 57. The force of this spring tends to hold the valve 33 and piston 31 at the lower extremities of their movement and to hold balancing piston 57 in firm engagement with the under surface of the cap 40. The joint between the upper end of the balancing piston 57 and the cap is provided with an annular sealing ring 63 to prevent the flow of fluid from the outer end 38 of the chamber 23 to exhaust. It will be noted that the diameter of the balance piston 57 is slightly less than the diameter of the opening 28 in the valve seat; the area of the valve body 31 thus exposed to pressures in the outer section of the chamber 23 is thus slightly greater than the area exposed to pressure in the inner section and the piston will be held with the valve in engagement with the valve seat by both fluid and spring pressure when the fluid pressures in the inner and outer sections of the chamber are substantially equal.

The pressure zone 53 is connected by a restricted vertical passage 64 in the cap with the outer section of the chamber 23. Communication between zone 53 and zone 54 of bore 48 is normally prevented by a ball valve 65 which is yieldably held against the seat 50 by the force of a compression spring 66. The ends of this spring engage centering devices 68 and 69, the first of which engages a ball valve 65 while the latter engages an adjusting screw 70. This screw has a knob 71 disposed exteriorly of the valve body so that the tension of spring 66, and consequently the operating pressure of the valve, may be adjusted as desired. The position of adjustment of screw 70 is maintained by a locking nut 72.

Guide bushing 51 is formed for the sliding reception of a push-off piston 73, the inner end of which is reduced as at 74 for engagement with the ball valve 65. The reduction of this end of the piston provides space for the flow of fluid from zone 53 through the opening in the valve seat 50. It will be noted at this point that the diameter of the push-off piston is slightly greater than the diameter of the opening in the valve seat.

The operation of the unloading valve above described is as follows: Pump 14 draws fluid from the reservoir 13 and forces the same through line 17 to the accumulator 20, this fluid flowing through the body 22 and the inner portion of the bore 23. Some of the fluid flows through the passages 42, 41, 44 and 47 to the outer end 38 of the chamber 23; this fluid is under the same pressure except for a slight pressure drop due to the restriction 46 as the fluid in the inner end of the chamber, this pressure also being introduced through restricted passage 64 to the zone 53. The restriction 64 also causes a slight pressure drop. The pressure from pump 14 is also introduced to the accumulator 20 through line 17. Fluid at accumulator pressure flows through a branch line 75, connected with the line 17 between the accumulator and check valve 21, to an adapter 76 which is threaded into the open end of bore 48. Adapter 76 has a reduced passage 77 which establishes communication between the branch line 75 and the zone 52, which zone will therefore receive fluid under substantially the same pressure as that existing in the accumulator. When the pump 14 is in operation, the pressure in all of these elements and passages will be approximately the same, this pressure being applied to the ball valve 65 through the opening in the seat 50, such pressure tending to move the ball valve away from the seat. When the pressure increases sufficiently to force the ball off the seat far enough to permit fluid to flow from zone 53 faster than it can be maintained through the reduced passage 64, the pressure in zone 53 will be reduced.

Since the area of piston 73 exposed to the pressure in chamber section 52 is greater than the area of ball 65 exposed to the pressure in chamber section 53, the drop in pressure in the latter chamber section will cause the push-off piston to suddenly apply an increased opening force to the ball valve permitting a greater drop in pressure in zone 53. This pressure drop increases the pressure differential between the zones 52 and 53 applying more force through piston 73 to move valve 65 further away from the seat 50. After valve 65 initially moves from its seat and fluid flow starts, the drop in pressure in zone 53 and the operation of piston 73 take place almost instantly. When the pressure falls in zone 53, the pressure in section 38 of chamber 23 will also quickly fall, creating a pressure differential at opposite ends of piston 31, the greater pressure in this instance being at the inner end of chamber 23. This greater pressure will move piston 31 toward the outer end of bore 23 causing valve surface 33 to move away from seat 30 and fluid flow will be established through the opening 28 to the outlet port 25. As long as the pressure in accumulator 20 remains sufficiently high, push-off piston 73 will be held in a valve opening position and the pump 14 will operate under a very low load. When the accumulator pressure falls below that determined by the setting of adjusting screw 70, spring 66 will move valve 65 and push-off piston 73 back toward their normal positions wherein valve 65 will engage seat 50 to interrupt fluid flow from zone 53 and chamber section 38. The fluid pressures at opposite ends of piston 73 will quickly become balanced, relieving ball valve 65 of further action by piston 73. As the pressure in chamber section 38 increases the fluid pressure and the force of spring 62 will move valve 33 into engagement with seat 30. The accumulator will then commence to load, the entire pump volume flowing thereto. As the pressure again approaches the predetermined maximum, the unloading operation will take place once more, the flow of fluid past valve 65 starting first and creating the pressure differential at the opposite ends of the push-off piston 73 which then moves the valve further toward open position and retains it until the accumulator pressure falls. It is important to note that after the unloading operation has been initiated valve 65 will be controlled by piston 73 under the influence of accumulator pressure. This control continues as the accumulator pressure falls until valve 65 is seated after which valve 65 is again controlled by the pressure obtaining in zone 53 and chamber 38. It should also be noted that as long as valve 65 is seated, or the flow past this valve does not exceed the flow through passage section 46, the fluid pressures on opposite ends of the push-off piston 73 will be equal and this piston will have no effect or tendency to move valve 65.

While valve 10 has been illustrated in a preferred form it is obvious that the construction thereof might be varied considerably, without changing the operating principles of the invention, if it were not for the desire to utilize the parts of the relief valve shown in the above-mentioned Patent No. 2,580,128.

I claim:
1. In a hydraulic system of the type having a source of fluid pressure and an accumulator connected with said pressure source; an unloading valve between said pressure source and said accumulator comprising a body with a chamber communicating with said pressure source and an exhaust port; a valve seat between said chamber and said exhaust port; a piston body supported for sliding movement in said chamber; a valve movable with said piston body and cooperable with said seat to control fluid flow from said chamber to exhaust; passage means in one of said bodies establishing limited communication between the ends of said chamber at opposite ends of said piston body; mechanism for creating pressure differentials at opposite ends of said piston, said mechanism having a second chamber; a second valve seat dividing said second chamber into sections, one of said sections being connected with said exhaust port and another being connected by a restricted passage with the end of said first chamber opposite that communicating with said pressure source; a second valve means yieldably engaging said second seat; an auxiliary imperforate piston supported in the section of said second chamber communicating with said first chamber for movement toward and away from said second valve, one end of said auxiliary piston being exposed to the pressure in the section of said second chamber connected with said first chamber; and conduit means for applying fluid at accumulator pressure to the other end of said second mentioned piston.

2. In a hydraulic system of the type having a source of fluid pressure and an accumulator; an unloading valve between said pressure source and said accumulator; said valve comprising a body with a chamber communicating with said power source and an outlet port; a valve seat between said chamber and said outlet port; a piston slidably mounted in said chamber; a valve on said piston cooperating with said seat to control fluid flow between said chamber and said outlet port; passage means establishing restricted communication between the portions of said chamber at opposite ends of said piston; means partially responsive to accumulator pressures for creating pressure differentials at opposite ends of said piston, said means having a passage connecting the end of said chamber remote from said valve seat and said outlet port; a valve initially responsive to inlet port pressure in said passage; and a second imperforate piston means normally exposed at opposite ends to equal pressures, said second piston being responsive to the pressure in the accumulator and tending to retain said second mentioned valve in open position after initial opening movement thereof.

3. An unloading valve comprising a body having a chamber opening to one surface thereof and inlet and outlet ports communicating with said chamber, said chamber being formed for connection with the pressure section of a hydraulic system; a valve seat in said body between said chamber and said outlet port; a piston valve disposed for sliding movement in said chamber to cooperate with said valve seat; passage means establishing restricted communication between the space in said chamber at opposite ends of said piston; a cap secured to said one surface of said body, said cap having a chamber divided into three sections, one of said sections communicating with the chamber in said body and a second communicating with said outlet port; a second valve controlling communication between the first and second sections of said cap chamber; a second imperforate piston guided for movement between the first and third sections of said cap member; and means for connecting the third section of the chamber in said cap to the same section of the hydraulic system in communication with the chamber in said body, said second piston being responsive to pressure differentials in said third and first cap chamber sections to move said second valve toward an open position.

4. In a hydraulic system of the type having a fluid pump, an accumulator and a check valve between said pump and accumulator; an unloading valve between said check valve and said pump, said unloading valve comprising a body having a chamber and inlet and outlet ports communicating therewith; a valve seat in said body between said chamber and said outlet port; a piston valve disposed in said chamber for sliding movement to cooperate with said valve seat; passage means establishing restricted communication between the spaces in said chamber at opposite ends of said piston; a plurality of additional chamber sections provided in said body, one of said chamber sections communicating with said outlet port and a second communicating with the first-mentioned chamber and the first of said additional chamber sections, the third chamber section receiving fluid at the pressure in the accumulator; normally closed valve means controlling communication between said first and second chamber sections, said valve means being responsive to pressures obtaining in the second of said additional chamber sections; and a second piston disposed for engagement with said normally closed valve means, the ends of said second piston being exposed to pressures obtaining in the second and third of said additional chamber sections.

5. In a hydraulic system of the type having a fluid pump, an accumulator and a check valve between said pump and accumulator; an unloading valve between said check valve and said pump, said unloading valve comprising a body having a chamber and inlet and outlet ports communicating therewith; a valve seat in said body between said chamber and said outlet port; a piston valve disposed in said chamber for sliding movement to cooperate with said valve seat; passage means establishing restricted communication between the spaces in said chamber at opposite ends of said pistons; a plurality of additional chamber sections provided in said body, one of said chamber sections communicating with said outlet port and a second communicating with the first-mentioned chamber and the first of said additional chamber sections, the third chamber section receiving fluid at the pressure in the accumulator; normally closed valve means controlling communication between said first and second chamber sections, said valve means being responsive to pressures obtaining in the second of said additional chamber sections; and an imperforate push-off piston disposed for sliding movement between the second and third of said additional chamber sections and engagement with said normally closed valve means, said push-off pistons being responsive to differences in pressures in said second and third chamber sections.

6. An unloading valve comprising a casing with inlet and outlet ports formed for connection with pressure and exhaust sections, respectively, of a hydraulic system; a fluid-pressure responsive spring-loaded valve controlling communication between said ports; means responsive to inlet port pressure to create a pressure differential on said valve to move the same in opposition to said spring load, said means having a plurality of chamber sections, the first of which communicates with said outlet port, a second chamber section being connected with the first and the pressure zone at one end of said valve; a second valve responsive to the pressure in said second chamber section to control fluid flow between said first and second chamber sections; an imperforate push-off piston disposed between said second and third chamber sections for movement toward and away from said second valve; and means for connecting said third chamber section to the section of the hydraulic system connected with said inlet port, said pushoff piston being responsive to certain pressure differences between said second and a third chamber section to tend to retain said second valve in position to establish communication between said first and second chamber sections.

7. An unloading valve comprising a body with a piston chamber and inlet and exhaust ports communicating therewith; said inlet port being provided for connection with a fluid pump and an accumulator; a check valve between said inlet and the accumulator; a valve seat between said inlet and exhaust posts; a piston valve disposed for movement in said chamber toward and away from said seat to control communication between said inlet and exhaust ports, the piston of said piston valve dividing said chamber into inlet and control sections; passage means establishing limited communication between said inlet and control sections at opposite ends of said piston; a second passage means extending from said control section of said chamber to said exhaust port; a resiliently biased valve normally preventing fluid flow through said second passage means; and a piston disposed for movement toward said resiliently biased valve to move it from closed to open position; said piston being exposed at one end to the pressure in said accumulator and at the other end to the pressure in the control section of said chamber and preventing communication between said accumulator and said control chamber section.

8. An unloader valve comprising a body with a piston chamber and inlet and exhaust ports communicating therewith, said inlet port being formed for connection with a fluid pump and an accumulator; a valve seat between said inlet and exhaust ports; a piston valve disposed for movement in said chamber toward and away from said seat to control communication between said inlet and said exhaust ports, the piston of said piston valve dividing said chamber into inlet and control sections; passage means establishing limited communication between the chamber sections at opposite ends of said piston; an additional passage extending from the control section of said chamber to exhaust; a second valve seat dividing said additional passage into control and exhaust portions; a second valve means in said exhaust portion; means yieldably urging said valve means toward said second seat; additional piston means supported for movement toward and away from said second valve means; one end of said additional piston means being exposed to the pressure in the control portion of said additional passage; and means for applying pressure from the accumulator to the other end of said additional piston.

9. An unloader valve comprising a body with inlet and exhaust ports, said inlet port being formed for connection with a fluid pump and an accumulator; a valve seat between said ports; a piston actuated valve cooperating with said seat to control fluid flow between said ports; means for controlling pressures at opposite ends of the piston for said valve to cause the operation thereof, said means having a passage for normally balancing fluid pressures at opposite ends of said piston; means forming a second passage extending from the end of the piston remote from said valve seat to exhaust; a ball valve normally closing said second passage to prevent fluid flow therethrough, said ball valve having an area exposed to and responsive to a predetermined pressure in said inlet to permit fluid flow through said second passage; a second piston supported for movement to engage and disengage said ball valve; and means for applying fluid at a predetermined accumulator pressure to said second piston to move it to a position to retain said ball valve in fluid flow permitting position, said second piston serving at all times to prevent the flow of fluid at said predetermined accumulator pressure to exhaust.

10. An unloading valve comprising a body having an internal chamber formed for connection with the pressure section of a hydraulic system and inlet and exhaust ports connected therewith; a valve seat in said body between said chamber and said exhaust port; a piston movably received by said chamber and dividing the same into inner and outer sections; a valve element on said piston cooperating with said seat to control communication between said chamber and said exhaust port; restricted passage means establishing limited communication between the inner and outer sections of said chamber at opposite ends of said piston; additional passage means establishing communication between the outer section of said chamber and said outlet port; a yieldably loaded valve for controlling fluid flow through said additional passage means, said valve being responsive to the pressure in the outer section of said chamber; a second imperforate piston guided for movement toward and away from said yieldably loaded valve; and means forming a passage to apply fluid from the pressure section of the hydraulic system to one end of said second piston, the opposite end being exposed to the pressure in the outer section of said chamber, the pressures at the ends of said second piston normally being equal, the piston being responsive to a pressure differential at opposite ends thereof caused by initial opening of said yieldably loaded valve to tend to hold such valve in open position.

11. An unloading valve comprising a body with an internal chamber formed for connection with the pressure section of a hydraulic system and inlet and outlet ports communicating therewith; a valve seat between said chamber and said outlet port; a piston disposed for sliding movement in said chamber and dividing the same into inner and outer sections; valve means on said piston cooperating with said seat to control fluid flow from said chamber to said outlet port; passage means establishing limited communication between the inner and outer sections of said chamber at opposite ends of said piston; additional passage means extending between said outer section of said chamber and said outlet port; a resiliently closed valve in said additional passage, said valve being normally closed and responsive to predetermined pressure in said internal chamber to move to an open position; a second piston supported for movement adjacent said resiliently closed valve, said piston having one end exposed to the pressure in said outer chamber section and additional passage; and means forming a passage to apply fluid pressure from the section of the hydraulic system connected with said chamber to the other end of said piston, a higher pressure on the latter end of said piston tending to move the same to apply an additional opening force to said resiliently closed valve, the pressure at the ends of said piston being equal when said resiliently closed valve is closed.

WENDELL E. RENICK.

References Cited in the file of this patent

UNITED STATES PATENTS

| Number | Name | Date |
|---|---|---|
| 2,214,817 | Harrington | Sept. 17, 1940 |
| 2,388,820 | Bonnell | Nov. 13, 1945 |
| 2,410,751 | Schultz | Nov. 5, 1946 |
| 2,420,890 | MacDuff | May 20, 1947 |
| 2,429,489 | Roth | Oct. 21, 1947 |
| 2,447,820 | Schultz | Aug. 24, 1948 |
| 2,479,359 | Holt | Aug. 16, 1949 |
| 2,513,681 | Schultz | July 4, 1950 |

FOREIGN PATENTS

| Number | Country | Date |
|---|---|---|
| 576,167 | Great Britain | Feb. 20, 1943 |